United States Patent [19]

Shindo

[11] Patent Number: 5,428,413
[45] Date of Patent: Jun. 27, 1995

[54] EYE DIRECTION DETECTING APPARATUS

[75] Inventor: Osamu Shindo, Tokyo, Japan

[73] Assignee: Asaki Kogyo Kabushiki Kaisha, Tokyo, Japan

[21] Appl. No.: 1,224

[22] Filed: Jan. 6, 1993

Related U.S. Application Data

[63] Continuation of Ser. No. 618,965, Nov. 28, 1990, abandoned.

[30] Foreign Application Priority Data

Nov. 28, 1989 [JP] Japan ................. 1-310231

[51] Int. Cl.⁶ .................................. A61B 3/14
[52] U.S. Cl. ......................... 351/210; 351/209; 351/246
[58] Field of Search ............ 351/209, 210, 221, 246; 358/227; 250/201, 204

[56] References Cited

U.S. PATENT DOCUMENTS

| | | |
|---|---|---|
| Re. 31,370 | 9/1983 | Mashimo et al. . |
| 3,543,666 | 12/1970 | Kazel ................. 354/404 |
| 3,701,309 | 10/1972 | Thiele et al. .......... 351/187 X |
| 3,712,716 | 1/1973 | Cornsweet et al. ........ 351/7 |
| 3,724,932 | 4/1973 | Cornsweet et al. ........ 351/7 |
| 3,804,496 | 4/1974 | Crane et al. ............ 351/6 |
| 4,047,187 | 9/1977 | Mashimo et al. . |
| 4,183,642 | 1/1980 | Fukuoka . |
| 4,287,410 | 9/1981 | Crane et al. .......... 250/201 |
| 4,437,750 | 3/1984 | Ikari ................. 354/155 |
| 4,445,757 | 5/1984 | Enomoto et al. ....... 350/429 |
| 4,508,443 | 4/1984 | Matsuzaki et al. ..... 354/402 |
| 4,574,314 | 3/1986 | Weinblatt . |
| 4,636,624 | 1/1987 | Ishida et al. . |
| 4,786,934 | 11/1988 | Kunze et al. . |
| 4,836,670 | 6/1989 | Hutchinson ............ 354/62 |
| 4,857,720 | 8/1989 | Karasaki ............. 250/201 |
| 4,974,010 | 11/1990 | Cleveland et al. ..... 354/403 |
| 5,017,005 | 5/1991 | Shindo ............... 356/125 |
| 5,036,347 | 7/1991 | Tsunekawa et al. .... 354/400 |
| 5,260,734 | 11/1993 | Shindo ............... 354/219 |
| 5,262,807 | 8/1989 | Shindo ............... 354/210 |

FOREIGN PATENT DOCUMENTS

| | | |
|---|---|---|
| 55338 | 7/1982 | European Pat. Off. . |
| 2382056 | 9/1978 | France . |
| 1211815 | 9/1963 | Germany . |
| 1930007 | 1/1970 | Germany . |
| 3221184 | 1/1983 | Germany . |
| 3329603 | 3/1984 | Germany . |
| 3331264 | 3/1984 | Germany . |
| 3336265 | 4/1984 | Germany . |
| 3505864 | 8/1985 | Germany . |
| 3841575 | 7/1989 | Germany . |
| 4037907 | 5/1991 | Germany . |
| 40-26379 | 11/1965 | Japan . |
| 59-102202 | 6/1984 | Japan . |
| 60-032012 | 2/1985 | Japan . |
| 60-041013 | 3/1985 | Japan . |
| 60-174132 | 9/1985 | Japan . |
| 61-172552 | 8/1986 | Japan . |
| 62-047612 | 3/1987 | Japan . |
| 62-189415 | 8/1987 | Japan . |
| 1277533 | 8/1989 | Japan . |
| 1241511 | 9/1989 | Japan . |
| 1-268538 | 10/1989 | Japan . |
| 1-274736 | 11/1989 | Japan . |
| 1412707 | 11/1975 | United Kingdom . |
| 87/01571 | 3/1987 | WIPO . |

OTHER PUBLICATIONS

H. Schober, "Das Sehen", Markewitz-Verlag G.m.b.H., Darmstadt, Germany, (1950), 32–35.
I.E.E.E. Transactions on Biomedical Engineering, vol. BME-21, No. 4, Jul. 1974, pp. 309–317.

(List continued on next page.)

Primary Examiner—William L. Sikes
Assistant Examiner—Hung Xuan Dang
Attorney, Agent, or Firm—Sandler Greenblum & Bernstein

[57] ABSTRACT

The present invention relates to an eye direction detecting apparatus. The apparatus has a system for detecting an eye direction and a system for correcting the detected eye direction based upon a difference between a visual axis and an optic axis of the eye.

37 Claims, 4 Drawing Sheets

OTHER PUBLICATIONS

Patent Abstracts of Japan, vol. 14, No. 30, Abstract of Japanese Patent No. 1-268538, of Oct. 26, 1989, and English language translation of excerpts from Japanese Patent No. 1-268538.

Patent Abstracts of Japan, vol. 14, No. 37, Abstract of Japanese Patent No. 1-274736, Nov. 2, 1989, and English language translation of excerpts from Japanese Patent No. 1-274736.

Patent Abstracts of Japan, P-306, Oct. 5, 1984, No. 8, No. 219, Abstract of Japanese Patent No. 59-102202, published on Jun. 13, 1984.

G. Schröder, *Technische Optik Kurz Und Bundig*, Vogel-Verlag, Würzburg, Germany, Jun. 12, 1974, p. 41, Section 2.3.4, and an English language translation.

Methods and Design—Survey of Eye Movement Recording Methods, by Young and Sheena, Behavior Research Methods and Instrumentation, pp. 397–429 (vol. 7(5), 1975).

English Language Abstract of Japanese 60-41013.

English Language Abstract of Japanese 62-47612.

English Language Abstract of Japanese 62-189415.

"Psychological Physic of Vision" by Mitsuo Ikeda, 1975.

"Fixation Point Measurement By the Oculometer Technique" by John Merchant, Optical Engineering, Jul.-/Aug. 1974, pp. 339–342.

English Language Abstract of Japanese 60-32012.

EYE DIRECTION DETECTING APPARATUS

CROSS-REFERENCE DATA

This application is a continuation of application Ser. No. 07/618,965, filed Nov. 28, 1990, now abandoned.

The present application relates to U.S. patent application Ser. No. 07/576,191 filed Aug. 27, 1990 which is the continuation of now abandoned U.S. patent application Ser. No. 07/282,035, which is a continuation of U.S. application Ser. No. 07/152,359, which are expressly incorporated herein by reference in their entireties.

BACKGROUND OF THE INVENTION

1. Field of the Invention

This invention relates to an eye direction detecting apparatus for finding an eye direction or a gaze point of a user's eye in a finder system.

2. Description of the Prior Art

U.S. Pat. No. 4,574,314 discloses one kind of conventional eye direction detecting apparatus which detects an eye direction of a user when the user gazes into a view finder.

In U.S. Pat. No. 4,574,314 apparatus has a light source for guiding a light beam to a cameraman's eye and a television camera for receiving a light reflected by a cornea.

An operating circuit in the apparatus finds the coordinates of the gaze point at which a cameraman gazes, and determines which direction the cameraman looks at.

However, the conventional eye direction detecting apparatus is designed without considering the characteristics of the human's eye.

One of the characteristics of an eye is the difference between a visual axis equal to the eye direction and an optic axis. Referring to FIG. 3, which corresponds to FIG. 44 on page 426 of "Behavior Research Methods & Instrumentation 1975, Vol. 7(5)", it can be understood that a visual axis forms an angle of 5°~7° in general with the optic axis.

Strictly speaking, the above-mentioned detecting apparatus does not detect the eye direction, but the direction of the optic axis. The detected direction is slightly different from the eye direction in which the user looks at.

Another problem is an individual variation. The above-mentioned difference angle is a statistical average. If the individual variation is takes into consideration, the angle would be variously distributed. A distance value k1 is also varied with the individual variation.

Even if, therefore, the difference between the visual axis and the optic axis is optically corrected, the difference owing to the individual variation might remain.

Furthermore, the difference between the two axes is varied when the user wears contact lenses.

SUMMARY OF THE INVENTION

The present invention has been accomplished in view of the above-mentioned problems. It is an object of the present invention to provide an eye direction detecting apparatus which can correct a difference dispersion based on the individual variation or the decentering of a contact lens.

The eye direction detecting apparatus according to the present invention has a memory for storing personal correcting data which indicates the difference between a logical eye direction and an eye direction under observation, and means for correcting a detected signal based on the correcting data.

BRIEF DESCRIPTION OF THE DRAWINGS

FIGS. 4(a), 4(b) and 4(c) are graphs showing video signals without corrections, in which FIG. 4(a) shows the case at the time when a user gazes at a point where X=0.00 mm, FIG. 4(b) shows the case where X=−9.00 mm, and FIG. 4(c) shows the case where X=+9.00 mm.

DETAILED DESCRIPTION OF THE EMBODIMENTS

The embodiment of the present invention will now be described hereinafter with reference to the drawings. The present disclosure relates to subject matter contained in Japanese patent application No. HEI 1-310281 (filed on Nov. 28, 1989) which is expressly incorporated herein by reference in its entirety.

It should be noted that the expression "eye direction" used in this application means "the direction of a looking or viewing line of an eye", with a line being, of course, an imaginary one.

Figure 1:
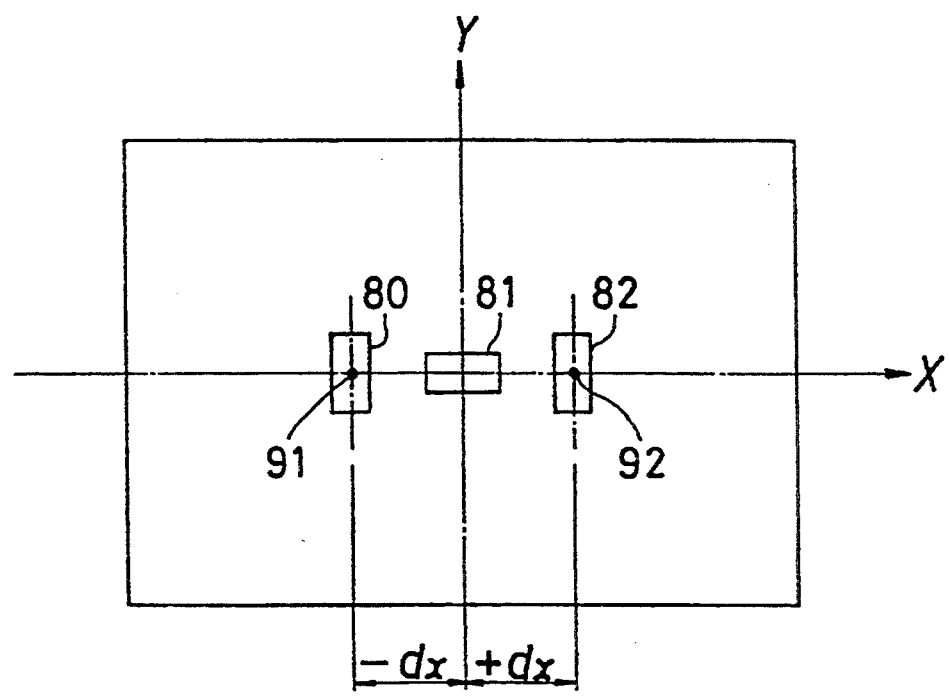
FIG. 1 is a schematic view of focus detecting zones and judgment zones in a view finder of a first embodiment according to the present invention.
Figure 2:
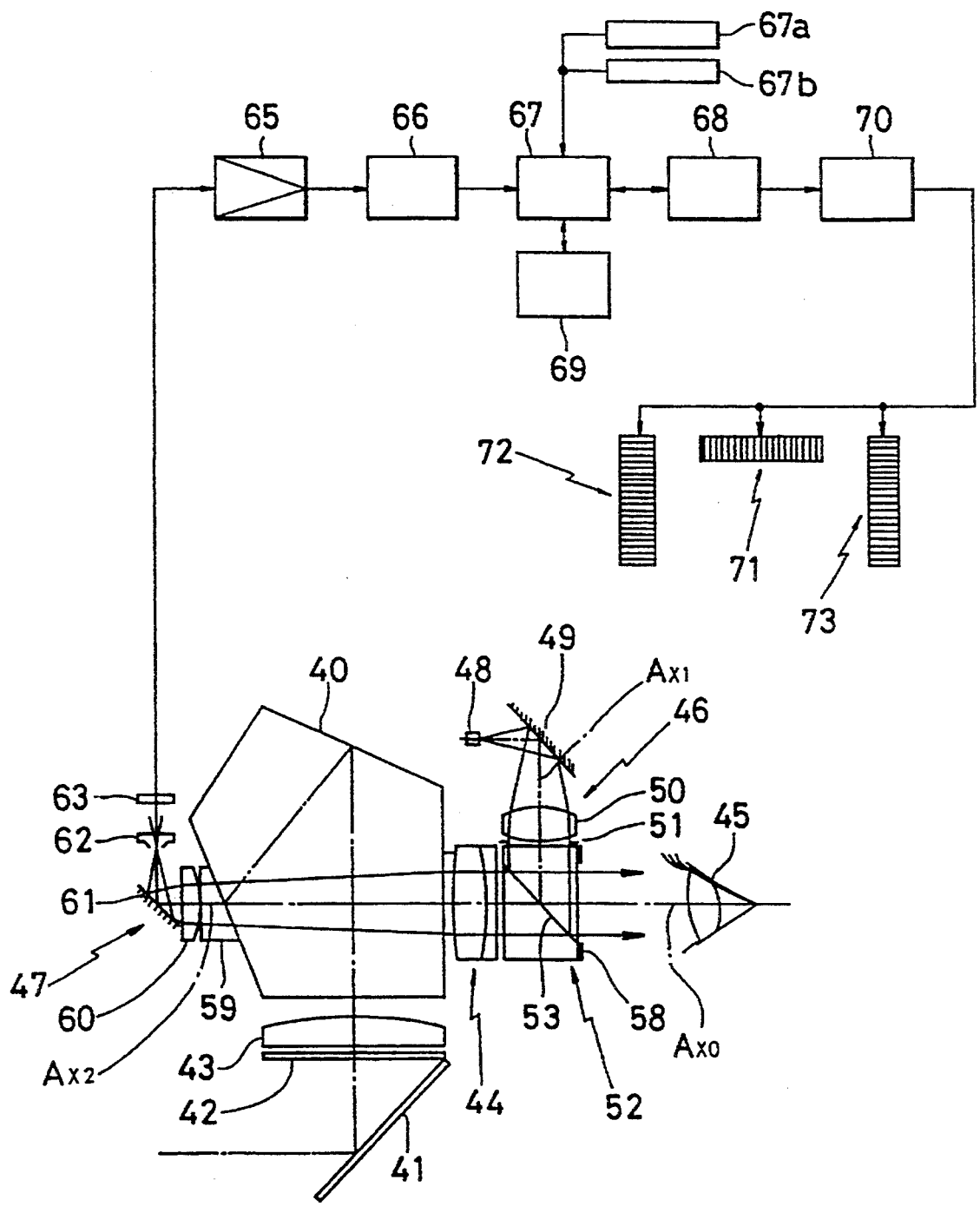
FIG. 2 is a schematic view showing a general construction of the eye direction detecting device according to the first embodiment.
Figure 3:
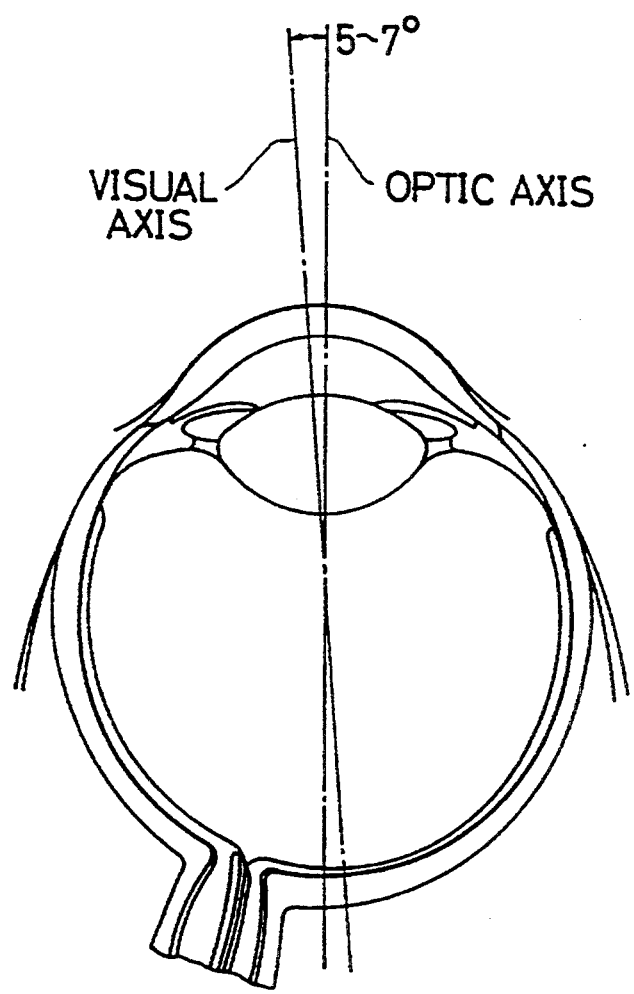
FIG. 3 is a schematic view of a structure of the human eye.

FIGS. 1 and 2 show one embodiment of the present invention.

First, a construction of the apparatus is explained according to FIG. 2.

In FIG. 2, 40 denotes a pentagonal prism built in a camera, 41 a quick return mirror, 42 a focusing plate, 43 a condenser lens, 44 a finder eye piece lens, 45 an eye of the user, and A×0 the optical axis of the finder system.

This camera is provided with three focus detecting optical systems (not shown), each focus detecting optical system being provided with a CCD line sensor 71, 72, 73, respectively.

Three focus detecting zones 80, 81, 82 corresponding to a view of each of the focus detecting optical systems are arranged as in FIG. 1. The peripheral zone 80 has a first correcting point 91 (X=+d) in the center thereof, and zone 82 has a second correcting point 92 (X=−d) in the center thereof. The correcting points are used for setting personal correcting data. However, this invention is not limited to the correcting points being set in the focus measurement zone.

An eye direction detecting optical system comprises a light emitting system 46 and a light receiving system 47. The light emitting system 46 guides a parallel light beam to an eye 45 of a user gazing into a finder. The light receiving system 47 detects a light reflected by the eye 45.

The light emitting system 46 has an infrared light emitting diode 48, a total reflection mirror 49, and a collimator lens 50. An infrared light emitted from the light emitting diode 48 is reflected by the total reflection mirror 49 and is made incident into the collimator lens 50. The collimator lens 50 is provided at its outgoing side surface with a diaphragm 51. The collimator lens 50 functions to convert the infrared light emitted by the light emitting diode 48 into of parallel pencil of rays of light.

At the side where the eye 45 is faced towards the finder eye piece lens 44, there is provided a light path overlapping optical member 52 for making the optical axis path of the light emitting system 46 and the optical path of the light receiving system 47 overlap. The light path overlapping optical member 52 comprises a rectangular parallelepiped lens comprising prisms having a reflecting surface 53.

The reflecting surface 53 employed in this embodiment is the type for semi-transmitting an infrared light and for transmitting a visible light. Since the reflecting surface 53 transmits a visible light, the user can see an image of the object formed on a focusing plate 42. The parallel pencil rays of light passed through the diaphragm 51 are reflected by the reflecting surface 53 in the direction towards the eye 45 and projected to the eye 45 of the user placed on an eye point.

A beam of light for forming a first Purkinje image based on a corneal specular reflection of the eye 45 and the reflecting light from a retina pass through the reflecting surface 53 of the light path overlapping optical member 52 and then they are guided to the light receiving system 47.

The light receiving system 47 comprises a compensator prism 59, a minifying lens 60, a total reflection mirror 61, a reimaging lens 62, and a CCD line sensor 63.

The user's eye 45 is usually placed on an eye point. The CCD line sensor 63 and the pupil of the user's eye 45 are optically conjugate with each other through the finder eye piece lens 44, the minifying lens 60, and the reimaging lens 62. The reflecting light from the eye 45 forms a silhouette of the pupil and the first Purkinje image on the CCD line sensor 63.

The output from the CCD line sensor 63 is amplified by the amplifier 65, then converted into a digital signal by an A/D converter 66. A digital output signal of the A/D converter 66 is input to a CPU 67 as judgment means and selecting means, and then temporarily stored in a RAM 68.

A setting switch 67a and a selecting switch 67b are connected to the CPU 67. The setting switch 67a is used for setting personal correcting data, and the selecting switch is used for selecting one of the correcting data.

Relating to a revolving angle $\theta$ formed between the optical axis of the finder and the visual axis, the distance between the center of the pupil and the first Purkinje image, and the distance k1 from the center of the pupil to the center of curvature of the cornea are expressed with the following equation:

$$d = k1 \cdot \sin \theta$$

If sin $\theta$ is developed by Taylor expansion and is approximated up to the primary term, the above-mentioned equation is changed into the following form:

$$d \approx k1 \cdot \theta$$

If term d0, offset from distance d, is taken into the approximate expression, the following equation is given:

$$d \approx k1 \cdot \theta + d0$$

The coefficients k1 and d0 are found based on two pairs of coordinates ($\theta$,d). How to set the coefficients will be explained below.

The CPU 67 finds the revolving angle $\theta$ based on the distance d, which is found from a video signal stored in the RAM 68, and the distance k1 and offset 0, which are selected and restored from $E^2$PROM (Electronically Erasable Programmable Read Only Memory) 69.

The CPU 67 finds the coordinate (X,Y) of the gaze point at which the user gazes based on the revolving angle $\theta$, and determines which judgment zone the user looks at on the coordinate. In case the gaze point is positioned in any judgment zone, the CPU 67 determines that the user selects the focus detecting optical system corresponding to the focus measurement zone in which the gaze point is positioned. After the judgment, the CPU 67 outputs a selecting signal to a driving circuit 70. The driving circuit 70 drives one of the CCDs 71, 72, 73 corresponding to the selected focus detecting optical system.

The focus detecting device (not shown) detects the focus state of the taking lens at a subject. An automatic focusing device of the camera drives a taking lens to focus at the subject.

Now, video signals without corrections will be described.

Figure 4:
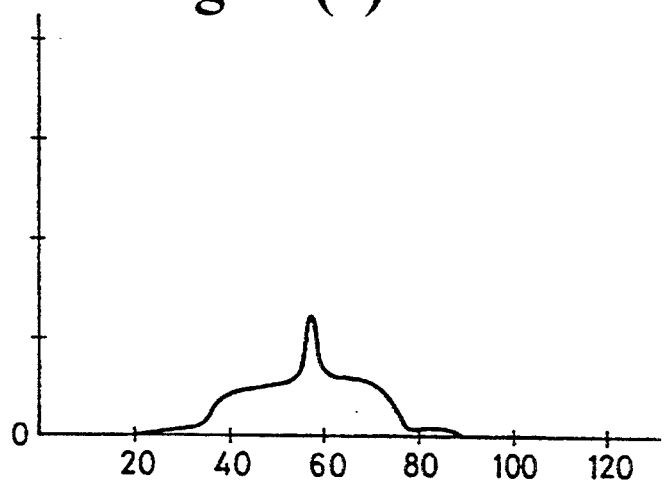
Figure 4:
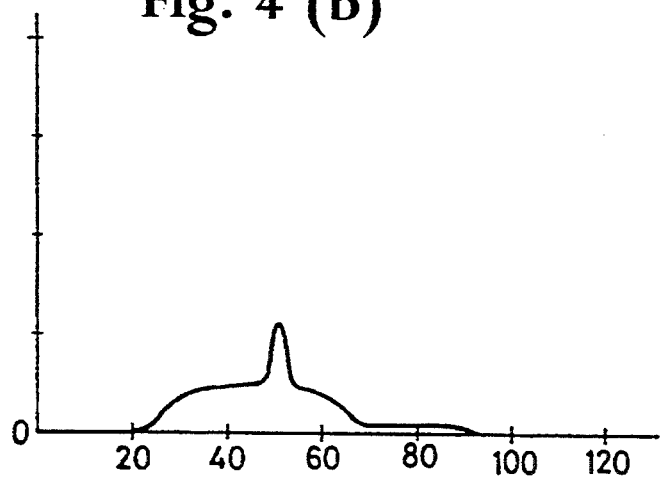
Figure 4:
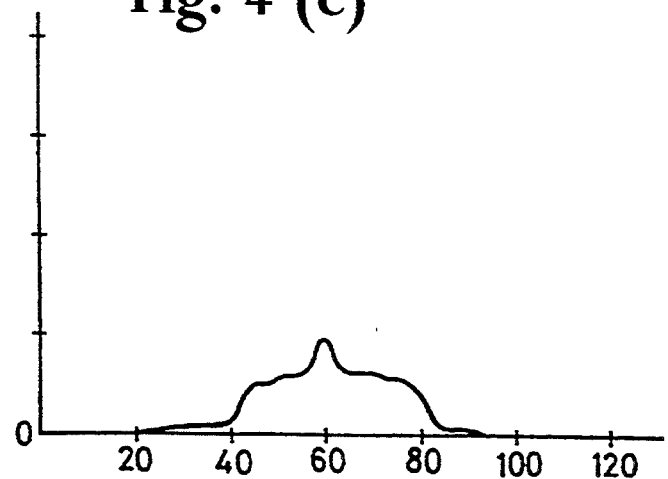

FIGS. 4(a), 4(b) and 4(c) show video signals under observation. An eye to be tested is a left eye wearing a contact lens. An axis of abscissa indicates the light amount and an axis of ordinate indicates bit number of the CCD line sensor.

FIG. 4(a) shows a video signal at the time when the user gazes at the center of the view finder at which of value of X-coordinate is 0.00 mm, so that the detected eye direction based on the video signal indicates X = −4.22 mm. FIG. 4(b) shows a video signal at the time when user gazes at the point where X = −9.00 mm, so that the detected eye direction is X = −13.11 mm. FIG. 4(c) shows a video signal at the time when the X-coordinate is +9.00 mm, so that the detected eye direction is X = 4.67 mm.

The result of the detection has a difference of −4 mm from the logical value to be detected. However, it is not clear how much the individual variation and the decentering of the contact lens influences the difference. But, at least it can be understood that the optic axis is pivoted to the minus side (an ear side) as a result.

Next, the setting and the selecting of the correcting data will be explained.

A sequence of the setting and the selecting are executed by operating the setting switch and the selecting switch. As mentioned above, in case the coefficients k1, d0 in the approximate expression are objects to be corrected, the coefficients are determined by giving two solutions of the ($\theta$,d). The eye direction detecting apparatus determines the coefficients after finding coordinates under observation based on an output video signal when the user gazes at the first and second correcting points 91, 92. Before the user sets correcting data, average or logic value is set as a default value of the correcting data.

When the user sets correcting data, the user gazes at the first correcting point 91 and pushes the setting switch 67a to ON. The CPU 67 operates to determine the coordinate of the gaze point under observation. When the CPU operates determines the coordinate, the CPU finds the average of the detections for setting one value in order to increase its reliability.

Next, the user gazes at the second correcting point 92 and again pushes the setting switch 67a to ON. The CPU 67 operates to determine the coordinate of the gaze point, in a according to the second correcting point similar manner as in the case of the first correcting point.

The CPU 67 substitutes the two coordinates for the approximate expression in order to operate coefficients k1, d0, which are values that are personal to the user, and stores them in the E²PROM. Next, the CPU 67 records an identification code into the E²PROM of an address that contains that of the correcting data, in order to make a relationship between the correcting data and the user. The personal value is inputted with a switch mounted on the camera or inputting means connected with the camera.

Moreover, the above-mentioned method requires two correcting points. However, if at least the offset, d0, is detected as a personal data and the distance k1 is treated as a fixed data, correction can be achieved. In that case, it is sufficient that a single correcting point be used in the view finder. The CPU 67 finds the value d0 which is operated based on the coordinate of the gaze point when the user gazes at the correcting point.

When the user uses the camera, he operates the selecting switch 67b to select his correcting data which are identified with the identification code. After selecting the personal data, when the eye direction is found, the detecting data is corrected with the personal correcting data of the user. The eye direction detecting apparatus can accurately detect an eye direction, since the variety of detection caused by individual variations is avoided.

In the above-mentioned embodiment, the correction of the eye direction detecting in the X axis direction was only explained, but it is clear that the correction in the Y direction can be also achieved. In the latter case, if two coefficients k1, d0 are used as variables, four correcting points are required, and if the coefficient d0 is only used as a variable, two correcting points are required.

In the preferred embodiment, a user sets each personal correcting data, and selects one's correcting data among plural person's data. However, if the apparatus can save only one person's correcting data, the user sets one's correcting data when he uses the camera after the other user used it.

What is claimed is:

1. An eye direction detecting apparatus, comprising:
   means for detecting a direction at which an eye gazes; and
   means for correcting said detected eye direction based upon a difference between a visual axis and an optical axis of said eye, said correcting means comprising means for storing a difference between a detected eye direction and a logical eye direction when said eve gazes at a correcting point, and means for subtracting said difference from said detected eye direction.

2. An eye direction detecting apparatus according to claim 1, wherein said detecting means comprises means for emitting and projecting light to said eye, means for imaging light reflected by said eye onto a light detecting element, and means for determining said eye direction based upon a video signal from said light detecting element.

3. An eye direction detecting apparatus according to claim 2, wherein said light detecting element comprises a line sensor.

4. An eye direction detecting apparatus according to claim 1, wherein said correcting means includes means for setting a plurality of correcting data that corresponds to a plurality of users of said eye direction detecting apparatus, and means for selecting personal data among said plurality of correcting data.

5. An eye direction detecting apparatus for use in a focus detecting system of a camera, comprising:
   means for detecting a direction at which an eye gazes;
   means for storing a plurality of correcting data that corresponds to a plurality of eyes;
   means for selecting personal data from among said plurality of correcting data;
   means for correcting said detected eye direction based upon one selected correcting data from said plurality of correcting data; and
   means for selecting a focus detecting system in response to said corrected detected eye direction.

6. An eye direction detecting apparatus, comprising:
   means for detecting a direction at which each respective eye of a plurality of eyes gazes;
   means for subtracting a correction data from said detected eye direction; and
   means for changing correction data for each said respective eye of a plurality of eyes.

7. An eye direction detecting apparatus according to claim 6, wherein said correcting means further comprises means for storing a plurality of differences and means for selecting one of said differences.

8. An eye direction detecting apparatus according to claim 7, wherein said means for storing a plurality of differences comprises means for storing a plurality of differences determined for a respective eye of each of a plurality of persons.

9. An eye direction detecting apparatus according to claim 8, further comprising means for determining said differences for each said respective eye of a plurality of persons.

10. An eye direction detecting apparatus, comprising:
    means for detecting a direction at which an eye gazes;
    means for detecting a difference between a detected eye direction and a logical eye direction when said eye gazes at a correcting point; and
    means for subtracting said difference from said detected eye direction.

11. An eye direction detecting apparatus according to claim 10, wherein said eye comprises a first eye, wherein said difference between a detected eye direction and a logical eye direction comprises a first difference, and wherein said means for detecting a difference between a detected eye direction and a logical eye direction further comprises means for detecting a second difference between a detected eye direction and a logical eye direction when a second eye gazes at a correcting point.

12. An eye direction detecting apparatus according to claim 11, wherein said wherein said means for detecting a difference between a detected eye direction and a logical eye direction further comprises means for detecting a third difference between a detected eye direction and a logical eye direction when a third eye gazes at a correcting point.

13. An eye direction detecting apparatus built into a camera, said eye direction detecting apparatus comprising:

means for detecting a direction at which an eye of a plurality of photographer eyes gaze;

means for subtracting a difference between a visual axis and an optical axis of said eye from said detected eye direction; and means for changing said difference for each said eye of a plurality of photographer eyes.

14. An eye direction detecting apparatus, comprising:

means for detecting a direction at which an eye gazes;

means for determining a difference between a detected eye direction and a logical eye direction when said eye gazes at a correcting point;

means for storing differences of a plurality of eyes;

means for selecting one difference from said stored differences; and means for subtracting said selected one difference from said detected eye direction.

15. An eye direction detecting apparatus in combination with a camera which has a plurality of focus detecting devices, said combination comprising:

means for detecting a direction at which an eye gazes;

means for determining a difference between a detected eye direction and a logical eye direction when said eye gazes at a correcting point;

means for storing differences of a plurality of eyes;

means for selecting one difference from said stored differences;

means for correcting a detected eye direction based on said selected difference; and means for selecting one of said plurality of focus detecting devices.

16. An eye direction detecting apparatus, comprising:

means for detecting a direction at which an eye gazes;

means for storing in memory a plurality of differences between detected eye directions and logical eye directions when a plurality of eyes gaze at a correcting point;

means for selecting one of said differences; and means for subtracting said difference from a detected eye direction.

17. An eye direction detecting apparatus according to claim 16, further comprising means for detecting said plurality of differences between detected eye directions and logical eye directions.

18. An eye direction detecting apparatus according to claim 17, wherein said means for storing in memory a plurality of differences between detected eye directions and logical eye directions comprises means for storing in memory a plurality of differences for eyes of a plurality of persons.

19. An eye direction detecting apparatus according to claim 17, wherein said means for detecting said plurality of differences between detected eye directions and logical eye directions comprises means for detecting said plurality of differences for eyes of a plurality of persons.

20. An eye direction detecting apparatus, comprising:

means for detecting a direction at which an eye gazes;

means for detecting personal data of said eye;

means for storing said detected personal data;

means for selecting one personal data from a plurality of personal data stored in said storing means according to a user; and means for correcting said detected eye direction based upon said personal data selected from said storing means.

21. The eye direction detecting apparatus according to claim 20, wherein said personal data comprises a difference between a detected eye direction and a logical eye direction when said eye gazes at a correcting point.

22. An eye direction detecting apparatus, comprising:

means for detecting a direction at which an eye gazes;

means for detecting personal data of said eye;

means for storing detected personal data; and means for correcting said detected eye direction based upon said personal data selected from said storing means, wherein said means for detecting personal data of said eye comprises means for detecting a respective specific value of at least one characteristic of each of a plurality of eyes.

23. An eye direction detecting apparatus, comprising:

means for detecting a direction at which an eye gazes;

means for subtracting a difference between a visual axis and an optical axis of said eye from said detected eye direction; and means for correcting said difference for said eye, said correcting means comprising means for storing a plurality of differences and means for selecting one of said differences.

24. An eye direction detecting apparatus according to claim 23, wherein said means for storing a plurality of differences comprises means for storing a plurality of differences determined for a respective eye of each of a plurality of persons.

25. An eye direction detecting apparatus according to claim 24, further comprising means for determining said differences for each said respective eye of a plurality of persons.

26. An eye direction detecting apparatus, comprising:

means for detecting a direction at which each respective eye of a plurality of eyes of a plurality of persons gazes;

means for subtracting a correction data from said detected eye direction; and means for changing said correction data for each said respective eye of a plurality of eyes of a plurality of persons.

27. An eye direction detecting apparatus built into a camera, said eye direction detecting apparatus comprising:

means for detecting a direction at which each respective eye of a plurality of photographers' eyes gaze;

means for subtracting a correction data from said detected eye direction; and means for changing said difference for each said respective eye of a plurality of photographers' eyes.

28. The eye direction detecting apparatus of claim 27, wherein said detecting means detects an angle $\Theta$ between an optical axis of a finder and a visual axis of the eye according to an equation:

$$d = k1 \cdot \sin \Theta + d0, \text{ where}$$

d is a distance between a first Purkinje image and a pupil center of the eye, k1 is a distance from the pupil center to a center of curvature of a cornea of the eye, and do is an offset term of the distance d, data for k1 and d0 being provided for each respective eye.

29. The eye direction detecting apparatus according to claim 28, wherein said data k1 and d0 for each respective eye is determined based upon two sets of data d and $\Theta$ detected by said detecting means when said eye gazes at a first correcting point and a second correcting point.

30. An eye direction detecting apparatus, comprising:

means for detecting a direction at which an eye gazes;

means for correcting said detected eye direction based upon a difference between a visual axis and an optical axis of said eye, wherein said correcting means comprises means for storing a plurality of correcting data that corresponds to a plurality of users of said eye direction detecting apparatus; and means for selecting personal data from among said plurality of correcting data.

31. An apparatus, said apparatus having at least one operational use dependent upon detection of eye direction, in combination with an eye direction detecting apparatus, said combination of apparatus and eye direction detecting apparatus comprising:

means for detecting a direction at which an eye gazes;

means for setting-up said apparatus for said operational use subsequent to setting-up, said setting-up means comprising:

means for detecting personal data of said eye; and
means for storing the detected personal data;

means for selecting said personal data, stored in said storing means, prior to said operational use of said apparatus; and means for correcting a detected eye direction based upon said personal data selected by said selecting means for operational use of said apparatus.

32. The combination according to claim 31, wherein said apparatus comprises a camera.

33. The combination according to claim 32, wherein said use dependent upon detection of eye direction comprises focusing said camera on one of a plurality of eye gazing areas of a finder of said camera.

34. The combination according to claim 31, wherein said setting-up means comprises means for setting-up said apparatus for said operational use by a plurality of persons, wherein said means for storing the detected personal data comprises means for storing discrete detected personal data for each of a plurality of persons, wherein said selecting means comprises means for selecting any of said discrete personal data for any of said plurality of persons.

35. An eye direction detecting apparatus mounted in a finder of a camera, comprising:

first means for detecting a first Purkinje image to determine a distance d between said image and a pupil center of an eye;

second means for detecting an angle $\Theta$ between an optical axis of said finder and a visual axis of the eye; and means for determining correcting data k1 and d0 based upon two sets of distance data d and $\Theta$ obtained when the eye gazes at a first correcting point and a second correcting point, said second detecting means detecting said angle $\Theta$ based upon an equation:

$$d = k1 \cdot \sin\Theta + d0, \text{ where}$$

k1 is a distance from the pupil center of the eye to a center of curvature of a cornea of the eye, and d0 is an offset term of said distance d.

36. The eye direction detecting apparatus of claim 35, further comprising:

means for storing a plurality of sets of correcting data k1 and d0 that correspond to a plurality of eyes; and means for selecting one set of correcting data from said plurality of sets of correcting data.

37. The eye direction detecting apparatus of claim 35, wherein said first detecting means comprises:

an emitter that emits and projects light to the eye; and
an imager that images light reflected from the eye onto a light detecting element.

* * * * *

UNITED STATES PATENT AND TRADEMARK OFFICE
CERTIFICATE OF CORRECTION

PATENT NO. : 5,428,413
DATED : June 27, 1995
INVENTOR(S) : Osamu SHINDO

It is certified that error appears in the above-indentified patent and that said Letters Patent is hereby corrected as shown below:

On title page, in item [73], Assignee, line 1, change "Asaki" to ---Asahi Kogaku---.
At column 5, line 58, (claim 1, line 9), change "eve" to ---eye---.
At column 6, line 60 (claim 12, line 2) change "wherein said wherein said" to ---wherein said---.

Signed and Sealed this

Thirtieth Day of April, 1996

Attest:

BRUCE LEHMAN

*Attesting Officer*  *Commissioner of Patents and Trademarks*